US 8,685,582 B2

(12) United States Patent
Steinhauser et al.

(10) Patent No.: US 8,685,582 B2
(45) Date of Patent: Apr. 1, 2014

(54) FUEL CELL SYSTEM HAVING AT LEAST ONE FUEL CELL

(75) Inventors: Benjamin Steinhauser, Bad Wurzach-Arnach (DE); Gerhard Konrad, Ulm (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/579,310

(22) PCT Filed: Dec. 4, 2010

(86) PCT No.: PCT/EP2010/007378
§ 371 (c)(1),
(2), (4) Date: Sep. 5, 2012

(87) PCT Pub. No.: WO2011/101009
PCT Pub. Date: Aug. 25, 2011

(65) Prior Publication Data
US 2012/0321978 A1    Dec. 20, 2012

(30) Foreign Application Priority Data
Feb. 17, 2010    (DE) .................. 10 2010 008 205

(51) Int. Cl.
*H01M 8/04*    (2006.01)
(52) U.S. Cl.
USPC ........... 429/436; 429/439; 429/437; 429/440; 429/441
(58) Field of Classification Search
USPC ......................... 429/429–451, 120
See application file for complete search history.

(56) References Cited

U.S. PATENT DOCUMENTS

| 8,007,946 B2 | 8/2011 | Alp et al. |
| 2004/0038095 A1 | 2/2004 | Kushibiki et al. |
| 2004/0229096 A1 | 11/2004 | Standke et al. |
| 2004/0258968 A1 * | 12/2004 | Voss et al. .................. 429/26 |
| 2005/0019633 A1 | 1/2005 | Tanaka |
| 2008/0220295 A1 * | 9/2008 | Harris .................. 429/17 |
| 2008/0261089 A1 | 10/2008 | Nonobe |
| 2009/0061270 A1 | 3/2009 | Tsunoda |

FOREIGN PATENT DOCUMENTS

| DE | 101 42 578 A1 | 4/2003 |
| DE | 10 2008 047 871 A1 | 5/2009 |
| JP | 2004-87169 A | 3/2004 |
| JP | 2005-44630 A | 2/2005 |
| JP | 2005-203263 A | 7/2005 |

(Continued)

OTHER PUBLICATIONS

International Search Report with English translation dated Mar. 25, 2011.

(Continued)

*Primary Examiner* — Patrick Ryan
*Assistant Examiner* — Kiran Quraishi
(74) *Attorney, Agent, or Firm* — Crowell & Moring LLP

(57) ABSTRACT

A fuel cell system includes at least one fuel cell and at least one air conveyor that conveys a process air flow to the fuel cell. At least one heat exchanger is also provided, through which the process air flow flows after the air conveyor and through which a cooling medium flow flows. A region with catalytically active material is arranged in the flow direction of the process air flow before or in the region of the heat exchanger. In addition a fuel can be fed to the region with the catalytically active material.

8 Claims, 2 Drawing Sheets

(56) References Cited

FOREIGN PATENT DOCUMENTS

| | | | |
|---|---|---|---|
| JP | 2007-128802 A | 5/2007 | |
| JP | 2008-269841 A | 11/2008 | |
| JP | 2009-54477 A | 3/2009 | |
| WO | WO 03/021696 * | 3/2003 | ........ H01M 8/04014 |
| WO | WO03/021696 * | 3/2003 | ........ H01M 8/04014 |

OTHER PUBLICATIONS

PCT/ISA/237.
Japanese Office Action dated Oct. 17, 2013 (Three (3) pages).

* cited by examiner

FUEL CELL SYSTEM HAVING AT LEAST ONE FUEL CELL

BACKGROUND AND SUMMARY OF THE INVENTION

Exemplary embodiments of the present invention relate to a fuel cell system with at least one fuel cell and the use of such a fuel cell system.

Fuel cell systems are known in themselves from the general prior art. A process air flow is thereby frequently made available to the fuel cell via an air conveying means. The process air flow flows through a cathode region of the fuel cell to supply it with atmospheric oxygen. The air fed to the fuel cell is compressed through the air conveying means, for example a flow compressor, a screw compressor, a Roots blower or similar, and is thereby correspondingly heated. When using a PEM fuel cell in the fuel cell system, this heating of the process air can contribute to a rapid drying out of the relatively sensitive membranes in the fuel cell. A heat exchanger is therefore frequently provided in such fuel cell systems as a charge air cooler, through which the process air flows after the air conveying means and through which a cooling medium, for example the comparatively cool exhaust air from the region of the fuel cell, flows in order to cool the process air flowing to the fuel cell after the air conveying means and thus to increase the lifespan and performance capability of the fuel cell.

It is additionally known from the general prior art that the cold start capability plays an important role for fuel cell systems and here in particular for fuel cell systems used in motor vehicles. Considerable resources are used in order to be able to start the fuel cell systems safely, reliably, and in particular very rapidly even at temperatures below freezing point. German Patent Application DE 10 2008 047 871 A1 discloses bringing about rapid heating of a fuel cell stack by means of various heat sources in a cooling circuit of the fuel cell stack. Should all these measures not suffice, the aforementioned patent application proposes conveying hydrogen to the cathode side of the stack and burning this together with the process air in the region of the electrocatalysts present in the fuel cell. A comparatively high heat energy can thus be produced in the region of the fuel cell itself.

This measure with the introduction of a comparatively large quantity of hydrogen into the cathode region of the fuel cell has the serious disadvantage that by supplying the hydrogen into the cathode region the catalyst present there is used for combustion, thus for the thermal conversion of the hydrogen with the oxygen of the process air. This results in a comparatively high point-by-point development of heat, which massively impairs the lifespan of the fuel cell.

Exemplary embodiments of the present invention provide a fuel cell system that guarantees very rapid heating of the fuel cell system without having to take into account the above-mentioned disadvantages in relation to the lifespan of the fuel cell.

According to the invention a fuel cell system with a heat exchanger is used, which is used as a charge air cooler for cooling the process air compressed by the air conveying means and thereby heated. According to the invention a region with a catalytically active material is thereby arranged before or in the region of the heat exchanger, through which the process air flow flows. In addition fuel is fed, as required, to the region with the catalytically active material. This results in the process air conveyed to the fuel cell not only being able to be cooled as in conventional operation but also as required, and here in particular in case of a cold start, being correspondingly heated through the addition of fuel into the region with the catalytically active material through a catalytic conversion of oxygen and fuel and in case of hydrogen-containing fuel being able to be moistened through the product water produced. This results in a very simple and efficient possibility of realizing through the supply of fuel a heating of the process air and thus of the fuel cell and the fuel cell system. As a result of the catalyst designed specially for this purpose and arranged before or in the region of the heat exchanger the heat is not produced in the region of the fuel cell itself but instead outside thereof. It is then introduced by the process air flow into the region of the fuel cell. Disadvantages relating to the lifespan of the fuel cell, as are known and usual in the structures according to the prior art, can thereby be prevented as in the region of the fuel cell itself no fuel reaches the cathode region thereof and must be correspondingly converted. The fuel cell system itself can thus be brought very quickly to operating temperature, in particular having regard to all components arranged in the region of the air supply.

In principle any type of cooling medium can thereby flow through the heat exchanger used as a charge air cooler on the cooling side. This heat exchanger can be designed, for example, integrated in a cooling circuit so that the process air heated after the air conveying means is cooled by the cooling medium of a cooling circuit which can, for example, also cool the fuel cell. In this case the heat produced through the catalytic conversion of the fuel with the oxygen, before or in the heat exchanger, can heat through this not only the process air flow but also the cooling medium flow so that this heats the cooling circuit and additionally also contributes to a more rapid heating of the fuel cell system.

In an advantageous embodiment of the fuel cell system according to the invention the region with the catalytically active material is integrated into the heat exchanger. This integration of the catalytically active material onto the side of the heat exchanger through which the process air flow flows thereby facilitates a very compact structure as the component of the heat exchanger serves both as a charge air cooler and also—if required—for the catalytic conversion of substances on its side through which the process air flows.

In a preferred development of the fuel cell system according to the invention the heat exchanger is coated in full or in part with the catalytically active material in the region through which the process air flow flows. Such a coating of the heat exchanger with the catalytically active material is comparatively easily to achieve. Therefore, with minimum use of catalytically active material, for example platinum or palladium, a correspondingly efficient catalytic conversion of air and fuel can be achieved. Unlike with the also conceivable pouring of pellets provided with catalytically active material or similar, the introduction of impurities into the region of the fuel cell is virtually excluded, meaning that filter elements and similar that would cause an unnecessary pressure loss are not necessary.

In a very favorable and advantageous development of the fuel cell system according to the invention the cooling medium flow is an exhaust air flow from a cathode region of the fuel cell.

This preferred structure uses the comparatively cool exhaust air from the cathode region of the fuel cell in regular operation to cool the process air for the fuel cell heated after the air conveying means. Because under correspondingly cold start conditions the compression of the process air does not suffice in order to heat this correspondingly significantly in order to thus prevent condensation of liquid and/or freezing of this liquid, according to the invention the region with the catalytically active material is provided before or in the region of the heat exchanger in order to heat the process air flow to the fuel cell through the addition of a fuel. This heat now also benefits the exhaust air flow, which is also still comparatively cold in such an operating situation. The exhaust air flow can thus be correspondingly heated and freezing of the exhaust air pipe or for example a turbine arranged in the exhaust air flow through condensing and freezing droplets can be prevented. The introduction of heat during the cold start of the fuel cell system through the catalytically active material in the region of the heat exchanger thus also serves to guarantee the operating capability of the fuel cell system on the exhaust air side in an ideal way.

The fuel cell system according to the invention has the advantage that it has a very compact and simple structure and provides a fuel cell system that can be started very simply and efficiently even in case of very low ambient temperatures. The preferred use of such a fuel cell system is therefore for the provision of electrical power in a transport means, which together with the fuel cell system, forms a mobile system. In such mobile systems a start from adverse conditions, in particular from temperatures below freezing point, can frequently occur. A rapid start of the system is indispensable especially in such systems as this is expected by the user, for example, when used in a motor vehicle as a transport means. Indeed, in motor vehicles with conventional drive systems a comparable behavior is present and is known and usual. The fuel cell system according to the invention can therefore fully exhibit its advantages in particular in such a structure.

BRIEF DESCRIPTION OF THE DRAWING FIGURES

Further advantageous embodiments of the device according to the invention follow from the remaining dependent claims and will become clear by reference to the example embodiment which is explained in greater detail by reference to the figures, in which:

DETAILED DESCRIPTION

Figure 1:
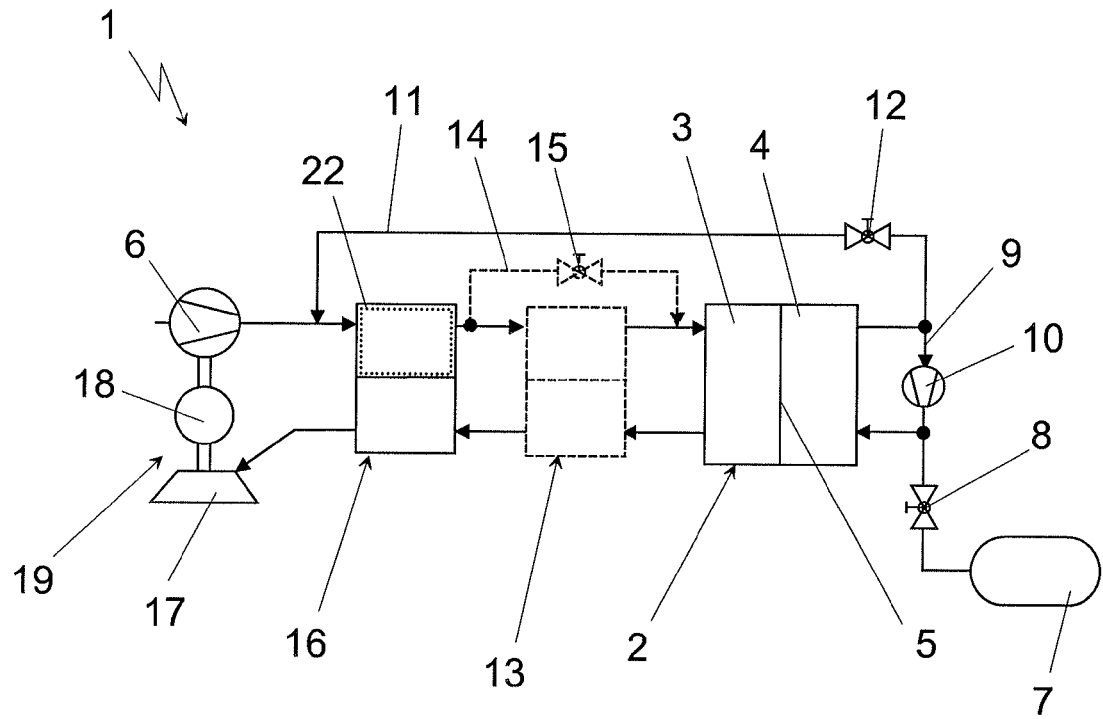
FIG. 1 shows a first possible embodiment of a fuel cell system according to the invention.

A fuel cell system 1 can be recognized in the illustration in FIG. 1. A fuel cell 2, which is constructed, for example, as a stack of PEM fuel cells, forms the core of the fuel cell system 1. A cathode chamber 3 and an anode chamber 4 of the fuel cell 2 are thereby separated from each other through proton exchange membranes 5. By way of oxidation means for operating the fuel cell 2 the oxygen in the air is typically used, for which purpose air is conveyed via an air conveying means 6 (e.g., a flow compressor, a screw compressor, a Roots blower or similar) into the cathode chamber 3. Hydrogen or a hydrogen containing gas is fed to the anode chamber 4. In the embodiment shown here hydrogen from a compressed gas storage element 7 is to be fed to the anode chamber 4 of the fuel cell 2. The hydrogen stored in this compressed gas storage element 7 under high pressure is fed via a valve 8 to the anode chamber 4 and thereby expanded to a pressure level suitable for the operation of the fuel cell 2. When using pure hydrogen as fuel for the fuel cell 2 this is typically made available to the anode chamber 4 with a higher volume flow than can be converted in the anode chamber 4 of the fuel cell 2. This provides a supply with an adequate quantity of hydrogen that is as regular as possible to the entirety of the active surface of the proton exchange membranes 5. The unused hydrogen is then removed from the anode chamber 4 via a recirculation line 9 and fed by means of a recirculation conveying means 10, for example a hydrogen recirculation blower and/or a gas jet pump or similar, together with fresh hydrogen from the compressed gas storage element 7, back to the anode region 4. In time nitrogen enriches in the region of the recirculation line 9, the nitrogen passing through the membranes 5 into the anode chamber 4, in the same way as a small quantity of product water which is produced in the anode chamber 4 of the fuel cell 2. As these inert substances cannot be converted in the fuel cell, over time they reduce the hydrogen concentration in the volume of the recirculation line 9 and the anode chamber 4. Therefore, from time-to-time the substances found in the region of the recirculation line 9 are discharged via a discharge line 11 and a valve 12 arranged therein in order to be able to maintain the hydrogen concentration in the anode chamber 4. By means of the discharge line 11 a certain quantity of residual hydrogen thereby always passes out of the system. It is therefore generally known and usual to feed the discharge line 11 into the region of the process air flow in order to thus convert any residual hydrogen in the cathode region 3 of the fuel cell 2 and to prevent hydrogen emissions. Through the extraordinarily low quantity of residual hydrogen, which arises from time-to-time during discharge (so-called purging), any disadvantages relating to the lifespan of the fuel cell 2 are countered.

The membranes 5 of the fuel cell 3 are comparatively sensitive to drying out. As the volume flow of air conveyed via the air conveying means 6 is typically dry a correspondingly high air volume flow can accelerate the drying out of the membranes 5. A moistener 13, which is formed for example as a gas-gas moistener, can thus be provided in the fuel cell system. The core of such a moistener 13 is constituted by membranes permeable to water vapor. On one side of the membranes the dry gas flow conveyed by the air conveying means 6 flows. On the other side of the membranes the exhaust air flow from the cathode chamber 3 of the fuel cell 2 flows. As the majority of the product water is produced in the cathode chamber 3 of the fuel cell 2 this exhaust gas flow is correspondingly loaded with liquid in the form of water vapor and droplets. The water vapor can moisten the dry feed air through the membranes in the moistener 13 so that moisture is removed from the exhaust air and while a moistening of the membranes 5 of the fuel cell 2 can be ensured due to the moistened feed air. Since complete moistening 2 is not desired in all situations, a bypass 14 can also be arranged around the moistener 13, here for example in the region of the feed air line to the cathode chamber 3, but in principle this is also possible similarly in the region of the exhaust air line from the cathode chamber 3. The bypass 14 can be controlled by a valve 15 in such a way that the volume flow to be moistened flowing through the moistener 13 is correspondingly divided. An adjustable moisture in the region of the cathode chamber 3 can thus be achieved.

The structure of the fuel cell system 1 in FIG. 1 additionally shows a heat exchanger 16 as a charge air cooler, through which likewise the feed air flows after the air conveying means 6 and through which the exhaust air from the cathode chamber 3 flows. After the air conveying means 6, the conveyed air will be correspondingly hot as it heats up correspondingly during compression. The exhaust air from the cathode chamber 3 on the other hand is cooler. As a result of the charge air cooler 16 a heat exchange arises between these two gas flows so that the air conveyed to the cathode chamber 3 is cooled and the air flowing away from the cathode chamber 3 is heated. Through the cooled air after the air conveying means 6 the risk of drying out of the membranes 5 of the fuel cell is further reduced.

The heated exhaust air from the charge air cooler 16 then flows into the region of a turbine 17 and is expanded and cooled in the region of this turbine 17. Mechanical energy can thereby be recovered via the turbine 17 from the exhaust gas flow of the fuel cell system 1. By means of the turbine 17 the air conveying means 6 can be directly supplied with mechanical energy in the embodiment shown here. In addition, an electric machine 18 can be provided, which can be operated as a generator in case of a corresponding energy excess in the region of the turbine 17 in order to additionally recover electrical energy from the exhaust gas flow. If more energy is required by the air conveying means 6 than can be provided by the turbine 17 the electric machine 18 can then also be operated as a motor. In this case it would provide the required energy difference to convey the air flow via the air conveying means 6. This structure comprising turbine 17, electric machine 18 and air conveying means 6 which is typically formed in this structure as a flow compressor is generally designated as an electric turbocharger 19 (ETC).

As a supplement in order to improve the operation of the turbine 17 an optional burner, for example a catalytic burner, a pore burner, a matrix burner or similar, can be provided in the exhaust air flow after the charge air cooler 16, via which exhaust gases of the fuel cell 2 and possibly optional fuel can be converted. The exhaust gas flow provided for the turbine 17 can thereby be heated in order to be able to generate more power via the turbine 17.

Figure 2:
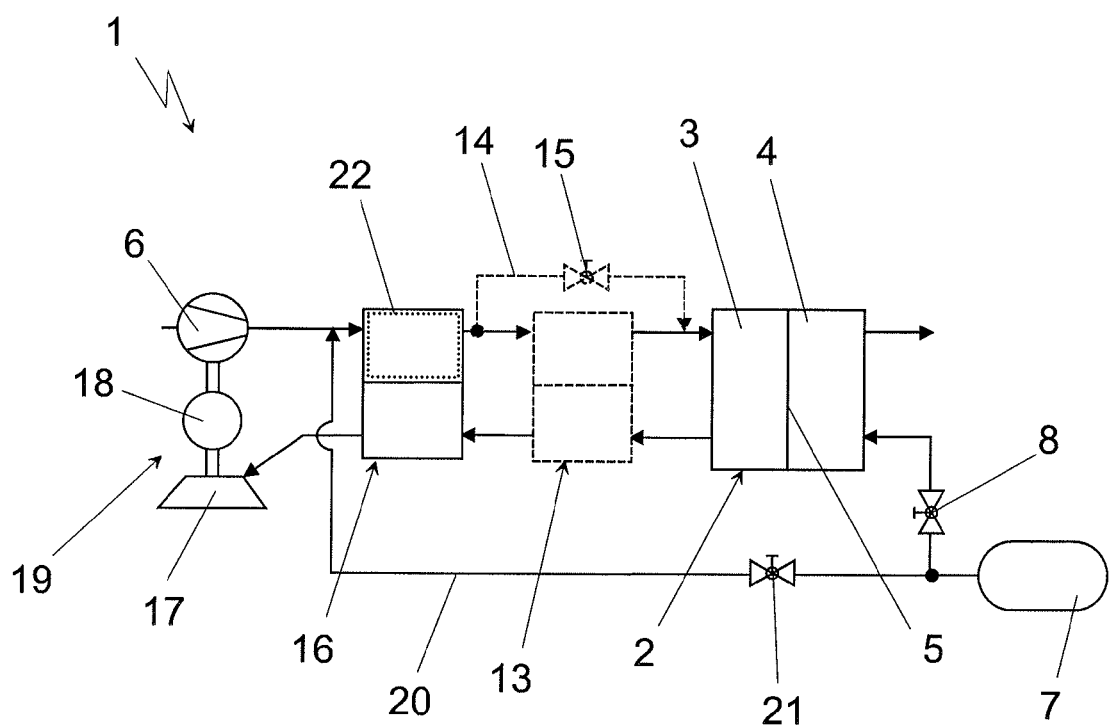
FIG. 2 shows a further possible embodiment of a fuel cell system according to the invention.

In the illustration of FIG. 2 a comparable system structure can be seen that could be used as an alternative to the fuel cell system 1 set out above. The structure differs essentially in that no recirculation line 9 exists around the anode chamber 4 of the fuel cell 2. In this structure the anode chamber 4 is not supplied with hydrogen or only with a small excess of hydrogen, which is converted elsewhere, for example is subsequently burned in the abovementioned optional burner. In the illustration of FIG. 2 a hydrogen line 20 can also be seen with a valve 21, the functionality of which will be discussed in more detail below.

With regard to the operation of a fuel cell system 1, as shown in FIG. 1 or 2, the normal operating case is typically that, by means of the air conveying means 6, process air is conveyed to the cathode chamber of the fuel cell 2 while hydrogen passes from the compressed gas storage element 7 into the anode chamber 4 of the fuel cell 2. Electrical energy and product water are then produced in the fuel cell 2, the product water being fed via the corresponding exhaust gas flows out of the system. The operation of such fuel cell systems 1 is always problematic when there are extremely low ambient temperatures. In particular when starting such a fuel cell system 1, thus if it is still at a very low temperature, this is a significant problem as frozen components and/or condensing moisture, which can then freeze again impair the functionality of the fuel cell system 1. The two fuel cell systems 1 in the illustrations of FIGS. 1 and 2 comprise a catalytically active material in the region of the heat exchanger 16, for example on a platinum and/or palladium base. This catalytically active material is shown in the illustrations of FIGS. 1 and 2 through a coating 22 (shown in dotted lines) of the part of the heat exchanger 16 through which the process air flows to the fuel cell 2. By means of the discharge line 11 and the valve 12 in case of the structure according to FIG. 1 or by means of the hydrogen line 20 and the valve 21 in case of the structure according to FIG. 2 fuel can now be fed to the process air flow after the air conveying means 6. In case of the structure according to FIG. 2 the fuel can flow directly from the compressed gas storage element 7 via the valve 21 and the hydrogen line 20 into the region of the process air flow. In case of the structure of the fuel cell system 1 in the manner shown in FIG. 1 a flow can be realized via the discharge line 11 that is already present and the valve 12 located therein such that during the cold start merely the valve 12 remains open. As soon as the anode chamber 4 is supplied with hydrogen there is a flow of the hydrogen in the region of the process air. In principle it would also be possible in both embodiments of the fuel cell system 1 to bring the fuel directly into the region of the heat exchanger 16 and not into the region of the process air flow flowing into it.

In both cases a conversion of the oxygen in the process air flow and of the fuel supplied via the discharge line 11 or the hydrogen line 20 arises in the region of the catalytically active material 22. This conversion of oxygen and hydrogen in the case illustrated here as fuel in the region of the catalytically active material 22 ensures heating of the heat exchanger 16 and the process air flowing through it. Through this heating a very rapid heating of the fuel cell 2 of the fuel cell system 1 can be realized without the catalyst found in the region of the fuel cell 2 being used to convert the starting substances. The heat is thereby introduced via the process air flow comparatively compatibly and evenly. The disadvantages relating to lifespan described above can thus be avoided.

The heating of the heat exchanger 16, which is cooled on its other side through the exhaust air flow from the cathode region 3 of the fuel cell 2, not only heats the process air flow to the fuel cell 2 but also heats the exhaust air flow from the fuel cell 2. Condensation of product water in the exhaust air flow from the fuel cell is thereby extensively avoided. Freezing droplets of liquid in the region of the exhaust air flow cannot therefore arise. Such ice particles would be very disadvantageous and dangerous for the turbine 17 as they could damage the turbine wheel of a rapidly running turbine 17.

A further advantage of the catalytically active material 22 arranged in the charge air cooler 16 lies in the structure of the fuel cell system 1 according to FIG. 1 in that even in regular operation the substance flow discharged from time to time via the discharge line 11 reaches the region of this catalytically active material 22. Residual quantities of hydrogen typically present in the substance flow can thus be converted in the charge air cooler 16 and therefore do not encumber the cathode region 3 of the fuel cell 2. Even if at the present time it must not be assumed that such low quantities of hydrogen could disadvantageously impair the lifespan of the fuel cell 2, this additional use of the charge air cooler 16 provided with the catalytically active material 22 nonetheless constitutes an advantage in the use of the fuel cell system 1 as in any case the supply of hydrogen into the cathode region 3 can be prevented.

Figure 3:
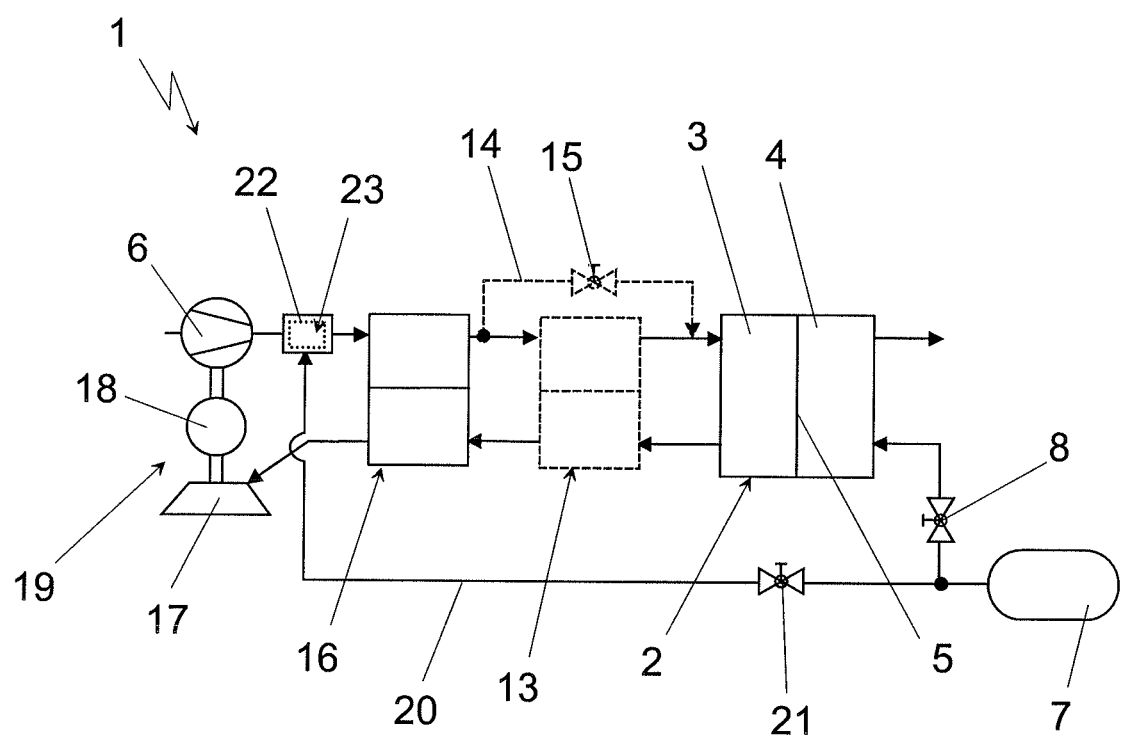
FIG. 3 shows a further alternative embodiment of a fuel cell system according to the invention.

FIG. 3 shows an alternative embodiment of the fuel cell system 1. This functions essentially like the fuel cell system 1 described within the scope of FIG. 2. Merely the catalytically active material 22 is integrated in the embodiment shown here into an individual component, for example a catalytic burner 23, which is arranged in the flow direction of the process air flow before the heat exchanger 16. The functionality is essentially the same as the process air heated in the catalytic burner 23, as required, flows through the process air side of the heat exchanger 16 after the catalytic burner 23 and unleashes comparable effects there as in the alternative embodiment with catalytically active material integrated into the heat exchanger 16.

All in all a very compact and very reliable structure can be achieved for a fuel cell system 1 which facilitates a very rapid start of the fuel cell system 1 without jeopardizing the lifespan of the fuel cell 2. The fuel cell system 1 is thus predestined to be used in transport means for the generation of electrical power. By way of transport means various transport means on water, in air or on land come into consideration, in particular for the transport of people and goods locally, over long distances or in the logistics field. The particularly preferred use thereby surely lies in the region of vehicles, in particular in the field of non-rail land vehicles, in which the fuel cell system is designed for the provision of electrical power for example for auxiliary power units and accessory power units and/or for an electric drive of the motor vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A fuel cell system comprising:
   a fuel cell;
   an air conveyor configured to convey a cathode process air flow to the fuel cell;
   a heat exchanger having
      a first chamber configured to receive the cathode process air flow from the air conveyor and at least one of anode exhaust gas and anode supply gas, wherein the first chamber has an outlet coupled to an inlet of the fuel cell cathode, and
      a second chamber configured to receive cathode exhaust gas,
      wherein the first and second chambers of the heat exchanger are arranged so that the first chamber transfers heat to the cathode exhaust gas passing through the second chamber; and
   a region with catalytically active material is arranged in a flow direction of the process air flow before or in a region of the heat exchanger, wherein the region with the catalytically active material is arranged so that at least one of the anode exhaust gas and the anode supply gas is fed to it.

2. The fuel cell system according to claim 1, wherein the region with the catalytically active material is integrated into the heat exchanger.

3. The fuel cell system according to claim 2, wherein the heat exchanger is coated in a region through which the cathode process air flow flows in full or in part with the catalytically active material.

4. The fuel cell system according to claim 1, wherein the region with the catalytically active material is an independent component in the flow direction before the heat exchanger.

5. The fuel cell system according to claim 1, further comprising:
   at least one line element connected to a region comprising fuel and connected in a region before the heat exchanger into which the process air flow flows to the heat exchanger.

6. The fuel cell system according to claim 1, further comprising:
   at least one line element connected to a region comprising at least one of the anode exhaust gas and the anode supply gas and connected into a region of the heat exchanger through which the cathode process air flow flows.

7. The fuel cell system according to claim 1, wherein the system is configured to provide electrical power in a transport means.

8. The fuel according to claim 7, wherein the electrical power is used to drive the transport means, wherein the transport means is a non-rail land vehicle.

* * * * *